(12) United States Patent
Marlatt et al.

(10) Patent No.: US 6,988,034 B1
(45) Date of Patent: Jan. 17, 2006

(54) NAVIGATION RADIO FOR FLEET CAR USAGE

(75) Inventors: Marc R Marlatt, Greenwood, IN (US); Jeffrey S Childress, Bloomington, IN (US); Marc A Dissosway, Bloomington, IN (US)

(73) Assignee: Harman International Industries, Incorporated, Northridge, CA (US)

( * ) Notice: Subject to any disclaimer, the term of this patent is extended or adjusted under 35 U.S.C. 154(b) by 81 days.

(21) Appl. No.: 10/606,629

(22) Filed: Jun. 26, 2003

Related U.S. Application Data (60) Provisional application No. 60/408,014, filed on Sep. 4, 2002.

(51) Int. Cl.
*G01C 21/26* (2006.01)
*G08G 1/09* (2006.01)

(52) U.S. Cl. ............... 701/200; 701/201; 701/209; 705/5; 705/6

(58) Field of Classification Search ............ 701/200, 701/201, 202, 204, 207, 209, 213, 214; 340/932.2, 340/995.19, 995.23, 995.27, 945, 933; 455/409; 705/5, 6, 1, 27; 709/219; 345/158; 379/67.1
See application file for complete search history.

(56) References Cited

U.S. PATENT DOCUMENTS

| | | | |
|---|---|---|---|
| 5,289,369 A | | 2/1994 | Hirshberg |
| 6,006,148 A | * | 12/1999 | Strong ..................... 701/33 |
| 6,141,610 A | * | 10/2000 | Rothert et al. ............. 701/35 |
| 6,240,365 B1 | | 5/2001 | Bunn |
| 6,330,499 B1 | | 12/2001 | Chou et al. |
| 6,339,745 B1 | | 1/2002 | Novik |
| 6,381,535 B1 | * | 4/2002 | Durocher et al. .......... 701/202 |
| 6,405,126 B1 | * | 6/2002 | Palomo et al. ............ 701/202 |
| 6,408,232 B1 | | 6/2002 | Cannon et al. |
| 6,711,548 B1 | * | 3/2004 | Rosenblatt ................ 705/6 |
| 6,810,527 B1 | * | 10/2004 | Conrad et al. ............. 725/76 |
| 2003/0034958 A1 | * | 2/2003 | Waesterlid et al. ........ 345/158 |
| 2003/0069899 A1 | * | 4/2003 | Brown et al. ............. 707/200 |
| 2003/0144005 A1 | * | 7/2003 | Videtich .................. 455/456 |
| 2003/0186715 A1 | * | 10/2003 | McGowan ................ 455/509 |
| 2004/0024846 A1 | * | 2/2004 | Randall et al. ............ 709/219 |

* cited by examiner

*Primary Examiner*—Tan Q. Nguyen (74) *Attorney, Agent, or Firm*—Brinks Hofer Gilson & Lione (57) ABSTRACT

A fleet vehicle navigation system for supplying driver specific information to the driver of a fleet vehicle includes a computing system, a short-range radio transceiver and at least one fleet vehicle. Once a driver is assigned to a fleet vehicle, driver specific information may be communicated between the computing system and fleet vehicle. Communication of driver specific information is triggered by the entry of the assigned fleet vehicle into a communication zone of the short-range radio transceiver. Driver specific information includes intended destinations of the driver, travel plans, vehicle settings and vehicle operational data.

11 Claims, 7 Drawing Sheets

NAVIGATION RADIO FOR FLEET CAR USAGE

PRIORITY CLAIM

This application claims the benefit of U.S. Provisional Application No. 60/408,014 filed on Sep. 4, 2002 which is incorporated herein by reference.

BACKGROUND OF THE INVENTION

1. Technical Field

The present invention relates generally to vehicle communication and navigation systems and, more particularly, to methods and systems for communicating with a fleet vehicle.

2. Related Art

In today's rental car market, a vehicle may be equipped with navigation capabilities. Navigation capabilities are typically achieved through the use of a navigation unit as is well known in the art. The navigation unit may be comprised of two primary components: a display unit mounted near the driver and a processing unit mounted remotely from the driver (e.g. in the trunk of the vehicle).

The Hertz Neverlost® navigation system is one such navigation unit. Unfortunately, this implementation adds significant additional cost to the purchase of the unit as well as installation and maintenance of the unit. When the rental car company is ready to sell the vehicle at the end of its in-service period, the navigation unit must be uninstalled. The navigation unit may then be reinstalled in another vehicle or disposed of if the navigation unit is at the end of its useful life. This creates significant overhead cost for the rental car company.

This technology also poses other significant limitations for the end user. The user interface for the navigation unit located in the passenger compartment of the vehicle, is often complex, and thus the operator of the vehicle must spend considerable time learning to use the system. Taking the time to learn how to operate the navigation unit, however, is not practical when the user is renting the vehicle for a period of merely days.

Outside of the rental car industry, there are vehicle navigation systems which allow a vehicle operator to remotely capture anticipated travel destinations. One such vehicle navigation system is the Online Pro™ navigation system provided by Becker Automotive Systems. In this system, the vehicle operator may enter anticipated destination information outside of the vehicle prior to travel. The anticipated destination information may be entered using a web-based software application accessed through the Internet. The entered destination information may be manually downloaded by the operator directly to the operator's vehicle.

A wireless interface is provided to the operator's vehicle using cellular phone technology such as global messaging service (GMS). Unlike the rental car situation, the operator's vehicle is known at the time destination information is entered into the system. In addition, the operator has usually familiarized himself with the operation of the vehicle navigation system. The wireless interface, however, requires a contract with a wireless phone provider and results in the accumulation of wireless phone charges when information is downloaded. In addition, wireless phone capability must be included in the vehicle and interfaced with the navigation system.

Therefore, it is desirable to provide an improved method and system for supplying navigation information to the driver of a fleet vehicle such as a rental vehicle.

SUMMARY

In accordance with the present invention, a fleet vehicle navigation system is provided for bi-directionally communicating driver specific information between a fleet vehicle and a central computing system. Communication occurs within a communication zone provided by a short-range radio transceiver. Entry into the communication zone by the fleet vehicle triggers temporary bi-directional communication between the fleet vehicle and the computing system.

When a fleet vehicle is assigned a driver, and then maneuvered into the communication zone, the communication of driver specific information is triggered. The driver specific information communicated from the computing system to the fleet vehicle includes intended destinations of the driver in the form of navigational coordinates and travel plans of the driver in the form of airline flight itineraries, etc. In addition, operator interface settings, such as radio stations presets, etc. may be communicated to the fleet vehicle. Driver specific information communicated from the fleet vehicle to the computing system also includes vehicle operational data such as mileage, fuel level, etc.

Within the fleet vehicle, the navigational coordinates may be translated to driving instructions to reach the intended destinations of the driver. The driver may then maneuver the fleet vehicle out of the communication zone to one or more intended destinations. While traveling, the driver may also electronically store the current geographic location of the fleet vehicle.

Upon re-entering a communication zone, temporary bi-directional communication of driver specific information may once again occur. Driver specific information communicated to the fleet vehicle from the computing system may include an updated travel itinerary that includes fleet vehicle drop off instructions and updated airline schedule/status information. Communication of driver specific information from the fleet vehicle to the computing system may include the current operator interface settings of the fleet vehicle, the navigational coordinate(s) entered by the driver while traveling and vehicle operational data. The operator interface settings and the navigational coordinates may be processed and stored in the computing system in association with the driver for future fleet vehicle assignments. The vehicle operational data may be utilized for billing and/or fleet vehicle usage tracking as well as maintenance and diagnostics of the fleet vehicle.

An interesting feature of the computing system involves a driver profile record for each driver and a vehicle profile record for each fleet vehicle. The driver profile record includes driver data, travel itinerary(s) and vehicle settings. The vehicle profile record includes a vehicle ID, vehicle specification information and vehicle operational data. When a driver is assigned a fleet vehicle, the driver specific record and the vehicle specific record are associated. The computing system may review the vehicle specification information and (if needed) convert the travel itinerary data and vehicle interface settings data to be compatible with the systems operating in the assigned fleet vehicle.

Another interesting feature of the fleet vehicle navigation system involves the intended destinations and travel plans captured by the computing system. The intended destinations may be captured by the computing system as a street address, a telephone number, etc. The computing system may then process the intended destinations to fully identify the destination as well as convert the intended destination to navigational coordinates and a text string description. The travel plans of a driver that are similarly less than fully identified may be processed by the computing system to include additional information.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention can be better understood with reference to the following figures. The components in the figures are not necessarily to scale; emphasis is instead being placed upon illustrating the principles of the invention. Moreover, in the figures, like reference numerals designate corresponding parts throughout the different views.

DETAILED DESCRIPTION OF THE PREFERRED EMBODIMENTS

Figure 1:
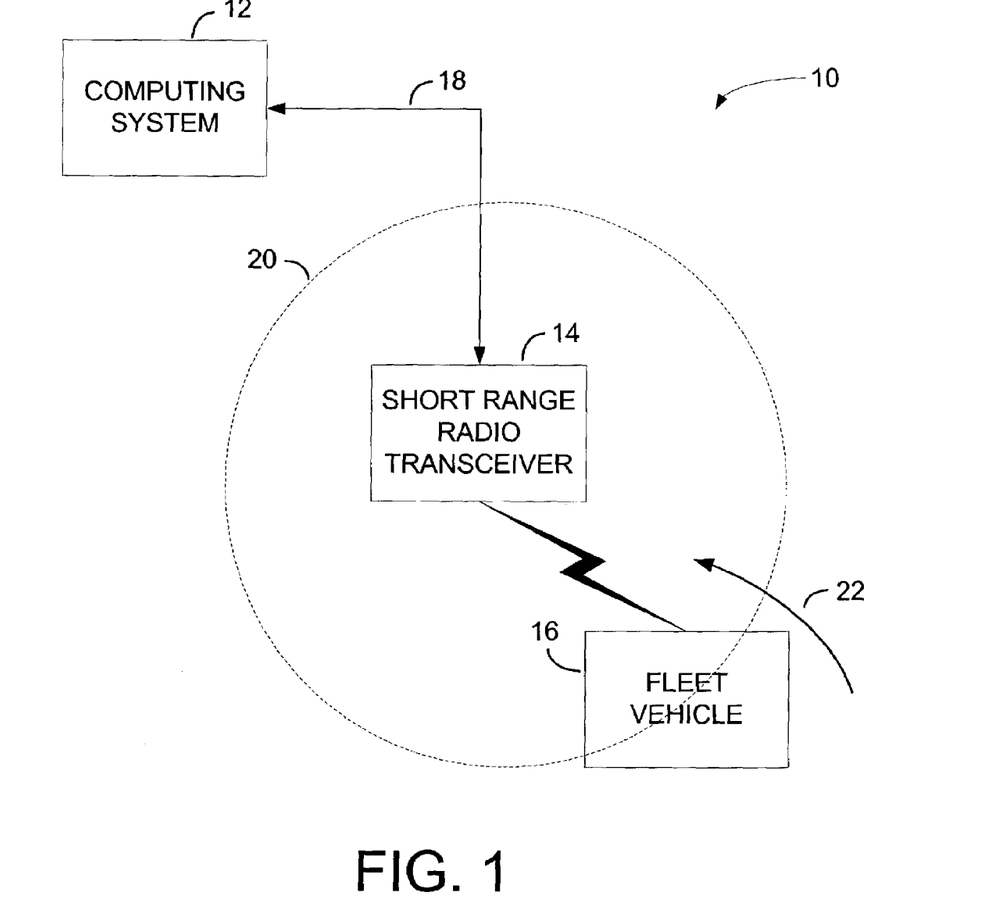
FIG. 1 is a block diagram of a fleet vehicle navigation system.

FIG. 1 is a block diagram of a fleet vehicle navigation system 10. The fleet vehicle navigation system 10 may be utilized in a vehicle fleet for bi-directionally communicating driver specific information to and from fleet vehicles. The fleet vehicle navigation system 10 includes at least one computing system 12 communicating temporarily via at least one short-range radio transceiver 14 with at least one fleet vehicle 16.

The computing system 12 may be any computer based system capable of allowing storage, access and manipulation of data related to the fleet vehicle navigation system 10. As such, the computing system 12 may include database(s), server(s), user terminal(s) and networks such as a local area network (LAN), a wide area network (WAN), an intranet, an extranet and/or the Internet. Equipment within the computing system 12 may also be dispersed among different geographic locations that cooperatively communicate with each other to support operation of the fleet vehicle navigation system 10.

Wireless and/or wireline communication capability may be included in the computing system 12 for communication with other systems, devices and/or networks. The computing system 12 may also bi-directionally communicate with the short-range radio transceiver(s) 14 over communication line 18 using wireline and/or wireless communication techniques. Short-range radio transceiver(s) 14 in different geographic locations may communicate with equipment of the computing system 12 that is geographically located locally or remotely.

The short-range radio transceiver 14 may be any device (s), capable of relatively low power transmission and/or receipt of information via radio waves. Relatively low power transmission may be provided by radio frequency (RF) transmitters transmitting radio signals with about 1 milliwatt of power or less. The communication standard for short-range radio transmission may be Bluetooth, Wi-Fi (IEEE 802.11b) or some other limited range wireless communication protocol. Such short range radio transmission may occur in a radio frequency (RF) range between about 2.402 and 2.48 gigahertz. Due to widespread acceptance in the wireless industry, Bluetooth is currently contemplated as the preferable template for implementation of low power, wireless connectivity within the fleet vehicle navigation system 10.

The Bluetooth standard communicates utilizing spread spectrum frequency hopping. Spread spectrum frequency hopping is a technique in which transmitters communicating utilizing Bluetooth randomly hop in unison among the available frequencies in a determined RF range. Hopping may occur about 160 times per second to minimize the risk of RF interference.

The short-range radio transceiver 14 has a limited radio communication range. With Bluetooth, for example, the communication range may be up to about ten meters, or up to about one hundred meters. The limited range of communication of the short-range radio transceiver 14 allows communication to be established with the fleet vehicle 16 only upon entry into a communication zone 20.

The communication zone 20 may be any designated geographic area defined by the communication range of the short-range radio transceiver 14. Preferably, the communication zone 20 is a geographic area that fleet vehicles 16 may be maneuvered into when communication is desirable. In the illustrated fleet vehicle navigation system 10, the communication zone 20 may be within a fleet vehicle staging area such as, a storage and maintenance facility, a rental car lot or any other geographic area where fleet vehicles 16 are congregated. The communication zone 20 may encompass a portion of the fleet vehicle staging area, such as entrance gate(s), exit gate(s), a parking area and/or any other designated area within the fleet vehicle staging area. Alternatively, the communication zone 20 may include the entire fleet vehicle staging area to include the area surrounding the entrances and exits of the fleet vehicle staging area. Multiple short-range radio transceivers 14 may cooperatively operate to form the communication zone 20.

Communication zone(s) 20 may also be established with short-range radio transceivers 14 in other locations outside the fleet vehicle staging area to allow short-range radio communication of information related to the fleet vehicle 16. Exemplary locations may include roadway toll plazas to allow short-range radio communication toll payments, law enforcement vehicles to allow short-range radio communication of vehicle information, vehicle maintenance facilities to allow short-range radio communication of vehicle operational data, etc.

The fleet vehicle 16 may be any vehicle equipped with capability to bi-directionally communicate via radio waves with the short-range radio transceiver 14. The fleet vehicle 16 should be broadly construed to include vehicles within rental car fleets, company car fleets, delivery service fleets, limousine service fleets, taxi cab fleets and the like. The communication of information between the short-range radio transceiver 14 and the fleet vehicle 16 may be automatically triggered when the fleet vehicle 16 is maneuvered within the communication zone 20 of the short-range radio transceiver 14. Accordingly, the communication may be referred to as "temporary" since the fleet vehicle 16 can be maneuvered out of the communication zone and communication will cease.

Information automatically communicated between the short-range radio transceiver 14 and the fleet vehicle 16 may be driver specific information. The driver specific information may include information from a driver profile specific to the driver assigned to the fleet vehicle 16 and information from a vehicle profile specific to the fleet vehicle 16. Upon entry of the fleet vehicle 16 into the communication zone 20 as illustrated by arrow 22, the computing system 12 may automatically exchange data with the fleet vehicle 16 via the short-range transceiver 14 to establish the identity of the fleet vehicle.

Following identification of the fleet vehicle 16, the driver assigned to the fleet vehicle 16 may be identified and driver specific information may be automatically bi-directionally communicated. The data transfer rate for exchanging the driver specific information is fast enough to support completion of a data transfer during the shortest period of time the fleet vehicle 16 is expected to remain within the communication zone 20. For example, a fleet vehicle 16 that is temporarily within the communication zone 20 while passing through an exit/entrance gate of the fleet vehicle staging area may complete the exchange of driver specific information.

Operation of the fleet vehicle navigation system 10 is generally applicable to company vehicle fleets, delivery service fleets, rental vehicle fleets, limousine service fleets, taxi fleets, etc. Accordingly, the information within the driver profile and the vehicle profile may differ depending on the particular vehicle fleet. Both the driver profile and the vehicle profile may be stored in the computing system 12. Association of the driver profile and the vehicle profile may occur within the computing system 12 when a driver is assigned to a fleet vehicle 16.

Figure 2:
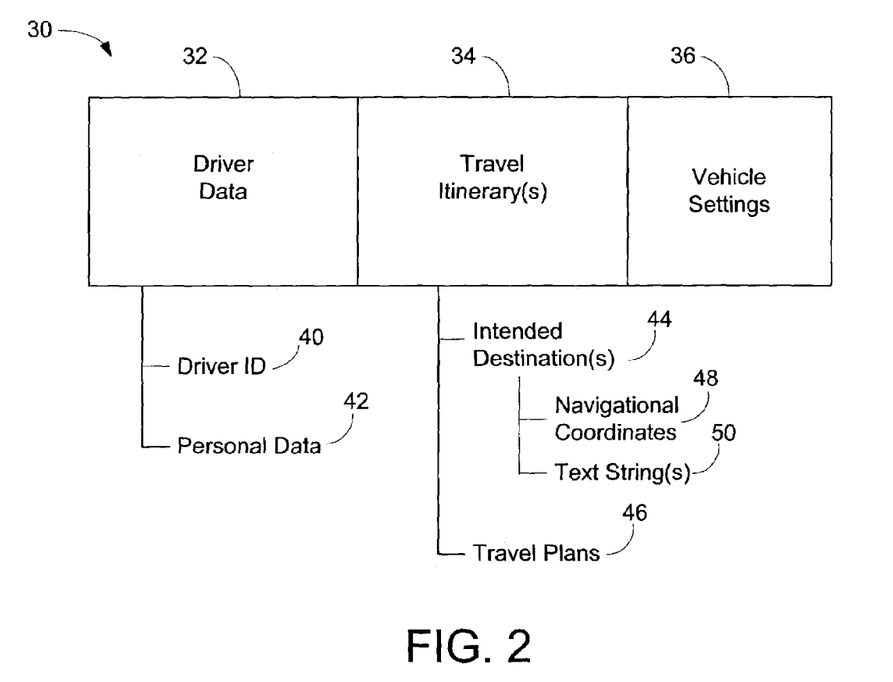
FIG. 2 is a table of data that may be stored in a driver profile record in the fleet vehicle navigation system of FIG. 1.

FIG. 2 is a table illustrating the information content of the driver profile in the form of a driver profile record 30 within the computing system 12 (FIG. 1). The driver profile record 30 may include driver data 32, at least one travel itinerary 34 and vehicle settings 36. Although illustrated as a single record, the information within the driver profile record 30 may reside in any number of databases or other data manipulation and storage devices. Accordingly, information within the driver profile record 30 may be completely stored within the computing system 12 (FIG. 1), partially stored within the computing system 12 or simply retrieved from other databases by the computing system 12 on an as-needed basis.

The driver data 32 may include unique driver identification (ID) 40, such as a driver number. In the rental car scenario, for example, the unique driver identification 40 may be a customer vehicle reservation number that can be correlated to the driver. In addition, the driver data may include personal data 42, such as, the driver's name, billing address, employee identification number, tax identification number and/or any other driver specific information.

The travel itinerary 34 may be any form of identification of the travel schedule of the driver. The travel itinerary 34 may include one or more intended destinations 44 the driver will drive to in the fleet vehicle 16 and one or more passenger travel plans 46 of the driver. In a typical rental car situation, for example, the driver's travel itinerary 34 may include travel in the rental vehicle to one or more intended destinations 44 in an unfamiliar geographic area and passenger travel plans 46 such as, airplane flight schedules, train schedules, or any other scheduled passenger travel plans. The passenger travel plans 46 may be based on reservations previously made by the driver with a corresponding passenger travel service, such as a travel agent, an airline, an online reservation service accessed over the Internet, etc. Intended destinations 44 may include hotels, restaurants, tourist sites, business destinations, a rental car return location and/or any other geographic locations reachable with the fleet vehicle 16 (FIG. 1).

The driver data 32 and travel itinerary 34 of the driver may be captured with the computing system 12. Capture by the computing system 12 may involve transferring the driver data 32 and/or travel itinerary 34 to the computing system 12, manual data entry, or any other mechanism for providing the information to the computing system 12.

In the rental car scenario, for example, the passenger travel plans 46 and intended destinations 44 of the driver may be captured in a travel itinerary 34 in a variety of ways. For instance, the driver may provide passenger travel plans and intended destinations in verbal or written form to either an independent travel agent and/or a customer service agent employed by the rental car company. The agent may then provide the travel plans and intended destinations to the computing system 12.

Alternatively, the travel itinerary information may be entered by the driver into the computing system 12. Entry of the intended destinations 44 and passenger travel plans 46 may be performed by entering the information into the computing system 12 verbally, via a terminal, via the Internet, via an intranet, via a wireless connection and/or any other communication mechanism and associated device. In any case, a travel itinerary 34 that includes intended destinations 44 and passenger travel plans 46 is preferably captured at the time the driver makes a vehicle reservation, but may occur at any time prior to picking up the fleet vehicle 16. In other fleet vehicle scenarios, travel plans and intended destinations (such as a delivery route) may be provided by, and entered into the computing system 12 by a dispatcher of the vehicle fleet, the driver, a customer requesting a delivery or any other mechanism.

Captured intended destinations 44 and passenger travel plans 46 may be processed by the computing system 12 to determine if all the desired information is included. Desired information for intended destinations 44 allows the identification of corresponding navigational coordinates. Similarly, desired information for passenger travel plans 46 includes flights numbers, arrival times, etc. sufficient to allow subsequent status updates of the passenger travel plans 46. If enough desired information is not present, the computing system 12 may dynamically determine excluded information. For example, a business name or telephone number provided as an intended destination 44 may be translated by the computing system 12 to a street address. Similarly, passenger travel plan(s) 46 information may be obtained via the network from the database of a passenger travel service(s) based on, for example, the driver's identity and the name of the passenger travel service.

Processing of the captured information may also involve converting the intended destination(s) 44 to navigational coordinates 48 and a text string 50. The text string 50 may identify a name for the destination such as "XXX hotel", "YYY office", etc. The navigation coordinates 48 are a set of latitude and longitude coordinates for identifying a geographic position.

The computing system 12 may also perform additional processing to update the travel itinerary(s) 34 on a regular basis and/or in response to predetermined events, such as temporary communication with the fleet vehicle 16 that the driver is assigned. As such, the computing system 12 may include updated travel plan information such as flight status, arrival/departure times, etc. In addition, intended destinations 44 may be captured, processed and stored in the computing system 12 following assignment of the fleet vehicle 16 to the driver.

Additional intended destinations may be captured based on information entered as previously discussed. Alternatively, intended destinations 44 may be entered into the computing system 12 from the fleet vehicle 16. The driver of the fleet vehicle 16 may maneuver the fleet vehicle 16 to a desired geographic location and then store navigation coordinates of the desired geographic location within the fleet vehicle 16. When the fleet vehicle 16 again establishes temporary communication with the short-range radio transceiver 14, the navigation coordinates may be communicated to the computing system 12. The navigation coordinates of these additional destinations may similarly be processed by the computing system to form an intended destination 44 within the driver profile record 30.

The passenger travel plans 46 and intended destinations 44 (including the navigational coordinates 48 and text string 50) may be stored within the computing system 12. Storage of the intended destination 44 may be in conjunction with the driver data 32 that uniquely identifies the driver specifying the destination information. Thus, each driver profile record 30 may include driver data 32, one or more intended destinations 44 and passenger travel plans 46. The intended destinations 44 and passenger travel plans 46 may be further categorized according to geographical area.

The driver data 32 may also be stored in connection with the vehicle settings 36. The vehicle settings 36 may include any vehicle interface setting that is an adjustable parameter within the vehicle operator interface of the fleet vehicle 16. For example, when a driver operates an assigned fleet vehicle 16, the driver typically makes adjustments to the vehicle operator interfaces, such as mirrors, seats, cabin temperature, etc. Adjustment to the radio tuner in the vehicle for sound quality and radio station selection may also be performed by the driver during operation of the fleet vehicle 16. The vehicle interface settings may be captured, transmitted to the computing system 12 via the short-range radio transceiver 14 and stored within the driver profile record 30.

Figure 3:
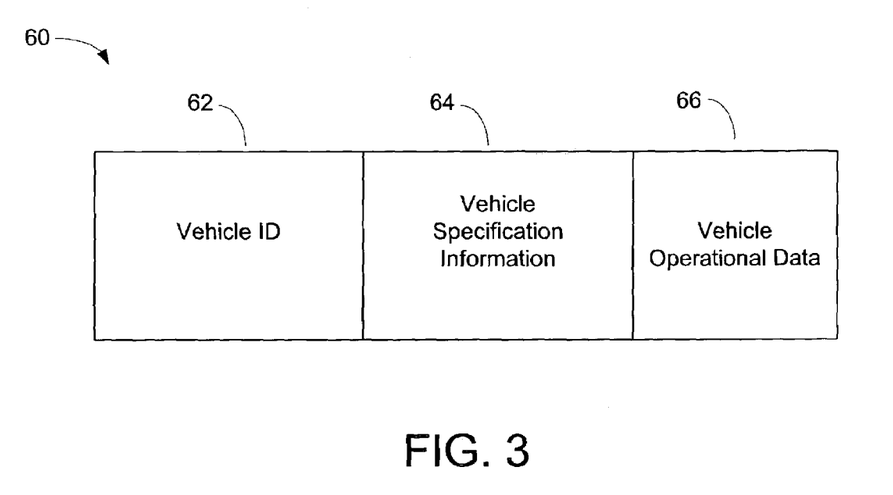
FIG. 3 is a table of data that may be stored in a vehicle profile record in the fleet vehicle navigation system of FIG. 1.

FIG. 3 is a table illustrating the information content of the vehicle profile contained within a vehicle profile record 60. The vehicle profile record 60 may include a unique vehicle identification (ID) 62, vehicle specification information 64 and vehicle operational data 66. Similar to the driver profile record 30 of FIG. 2, the vehicle profile record 60 may be stored within the computing system 12, partially stored within the computing system 12 (FIG. 1) or simply retrieved from other databases by the computing system 12 on an as-needed basis.

The fleet vehicle 16 (FIG. 1) associated with the vehicle profile record 60 may be identified by the vehicle ID 62. The vehicle ID 62 may be an assigned fleet vehicle number, a vehicle identification number (VIN) or any other unique identifier. The vehicle specification information 64 may include hardware and software descriptions of the systems and mechanisms within the fleet vehicle 16, such as hardware capabilities, software versions, database versions, communication protocol versions or any other fleet vehicle specific information.

The vehicle data 66 may include operational data such as mileage, gas level, vehicle diagnostic information and/or any other parameters related to operability of the fleet vehicle 16. Vehicle diagnostics may include alarms, such as low oil or tire pressure, indications, such as time for an oil change and/or any other parameters of interest to the owner/operator of the vehicle fleet. The owner/operator of the vehicle fleet may collect and archive fleet vehicle specific information from the fleet vehicles 16 for use in maintenance, billing, etc. Alternatively, the vehicle data 66 may be stored in memory in the vehicle.

Communication of driver specific information between the computing system 12 and the fleet vehicle 16 may involve the information contained in the driver profile record 30 and the vehicle profile record 60. The driver specific information communicated between the computing system 12 and the fleet vehicle 16 may vary depending on the fleet vehicle 16 assigned to the driver and the operational phase of the fleet vehicle 16.

The computing system 12 may further process the information in the data profile record 30 based on the vehicle specification information 64 in the vehicle profile record 60 of the assigned fleet vehicle 16. Further processing may involve selection of data compatible with the hardware and software operating in the assigned fleet vehicle 16 as well as modification of existing data. For example, the computing system 12 may convert the navigation coordinates 48 and associated text string 50 to be compatible with the software and equipment operating in the fleet vehicle 16. In addition, selection/conversion of the operator interface settings or any other driver specific information related to the equipment or functionality of the fleet vehicle 16 may be performed. Further, selection of radio presets within the operator interface settings may also be performed based on the intended destinations 44 of the driver.

The various operational phases of the fleet vehicle 16 generally include 1) driver assignment to a fleet vehicle, 2) removal of the fleet vehicle 16 from the fleet vehicle staging area, 3) operation of the fleet vehicle 16 by the driver while travel to reach intended destination(s), and 4) return of the fleet vehicle to the vehicle staging area. Return of the fleet vehicle to the vehicle staging area may be to the same vehicle staging area or another vehicle staging area in a different geographic location. The vehicle staging areas in the different geographic locations may be networked by the computing system 12 as previously discussed.

Referring now to FIGS. 1–3, in the first operational phase when the driver is assigned, the fleet vehicle 16 enters the communication zone 20 and temporary communication is enabled. The driver specific information may be communicated to the fleet vehicle 16 from the computing system 12. The information communicated to the fleet vehicle 16 in the first phase may include navigation coordinates 48, the text string 50, the travel itinerary 34 and the vehicle settings 36 from the driver profile record 30.

The second operational phase occurs when the driver takes physical control and begins operation of the fleet vehicle 16. During the second operational phase, upon entry into, or continued occupation of, the communication zone 20, the driver specific information communicated from the fleet vehicle 16 to the computing system 12 may include vehicle operational data and the time the fleet vehicle 16 was taken by the driver. The vehicle operational data may be stored in the vehicle data 66 of the vehicle profile record 60. Determination of the first and second operational phases may be based on the geographic position of the fleet vehicle 16, entry of the fleet vehicle 16 into certain communication zones 20, identification of the driver, or any other parameters. The first and second phases may occur at the same time where the fleet vehicle 16 does not enter the communication zone 20 until the driver is exiting the fleet vehicle staging area.

During the third operational phase, the fleet vehicle 16 may be outside the communication zone 20 and therefore unable to communicate with the central computing system 12. In addition, the driver may store navigational coordinates and change/add vehicle interface settings. Further, vehicle operational data may be gathered as the fleet vehicle 16 is driven during the third phase.

During the fourth operational phase, when the driver returns the fleet vehicle 16 to the fleet vehicle staging area, temporary bi-directional communication of driver specific information between the computing system 12 and the fleet vehicle 16 may be triggered upon re-entry into the communication zone 20. Driver specific information transferred to the fleet vehicle 16 may include additional navigation coordinates 48, additional text strings 50 and updated passenger travel plans 46 provided from the driver profile record 30.

Driver specific information provided from the fleet vehicle 16 to the computing system 12 in the fourth phase may include navigation coordinates entered by the driver, current vehicle interface settings and vehicle operational data. The navigation coordinates and vehicle interface settings may be stored in the travel itinerary 34 and the vehicle settings 36, respectively, of the driver profile record 30. The vehicle operational data may similarly be stored in the vehicle data 66 of the vehicle profile record 60.

Figure 4:
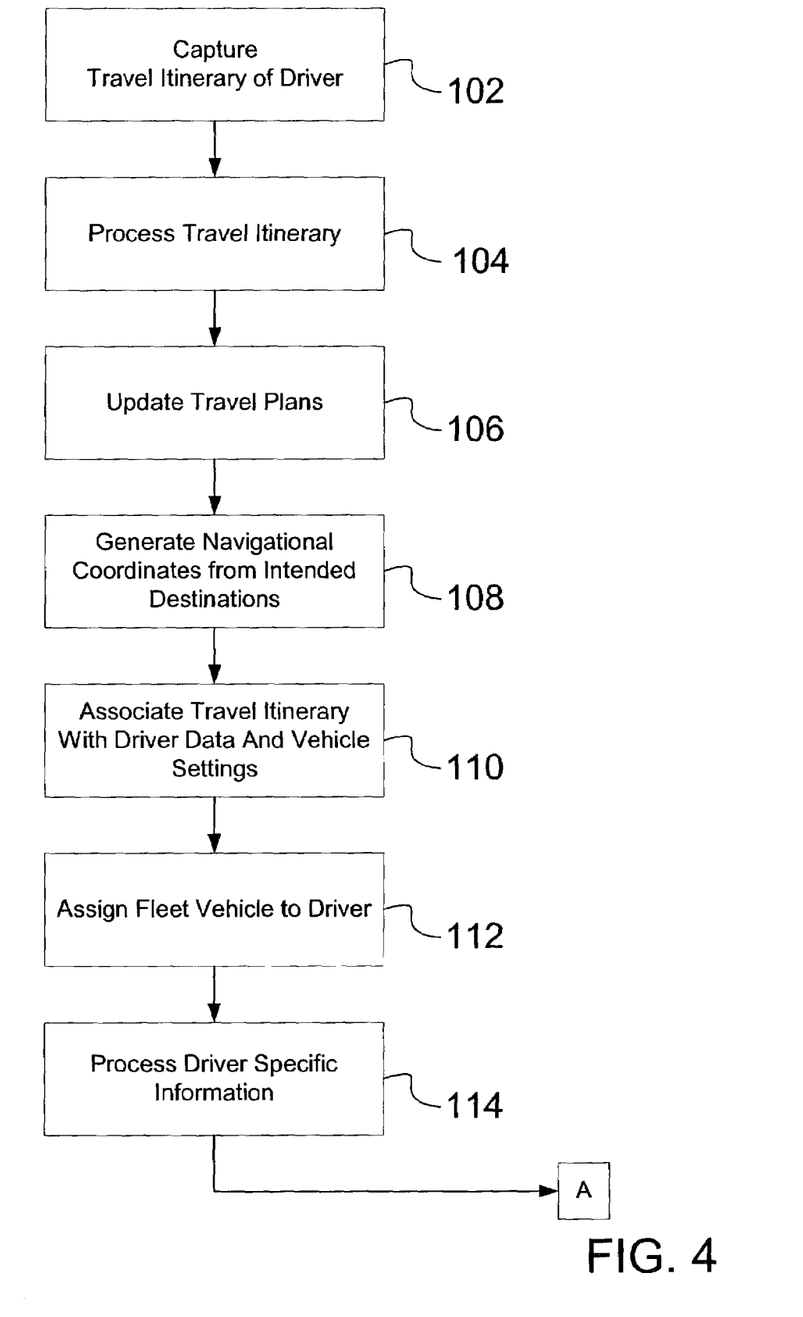
FIGS. 4–7 is flowchart illustrating operation of the fleet vehicle navigation system of FIG. 1 in an exemplary rental car fleet scenario.

FIG. 4 is a block diagram illustrating operation of the fleet vehicle navigation system 10 in an exemplary rental car situation. In this example, the driver data 32 (FIG. 2) and vehicle settings 36 have been previously obtained and are available to the computing system 12. In addition, the vehicle ID 62 (FIG. 3) and the vehicle specification information 64 has similarly been obtained and made available to the computing system 12.

Referring now to FIG. 4 with reference to FIGS. 1–3, operation begins at block 102, when the travel itinerary 34 for the driver is captured with the computing system 12. The captured travel itinerary 34 is processed within the computing system 12 at block 104. At block 106, the passenger travel plans 46 may be updated by obtaining additional information or otherwise updating the travel plans of the driver. Generation of navigational coordinates 48 and text strings 50 from intended destination(s) 44 of the driver is performed at block 108.

The processed travel itinerary 34 (including the navigation coordinates 48 and text strings 50) is associated with driver data 32 and the vehicle settings 36 in the driver profile record 30 at block 110. At block 112, the driver is assigned a particular rental vehicle from a fleet of rental vehicles by associating the driver data 32 with a vehicle ID 62 (first operational phase). In response to the assignment of a particular, rental vehicle to the driver, the computing system 12 further processes the driver specific information within the driver profile record 30 at block 114.

Figure 5:
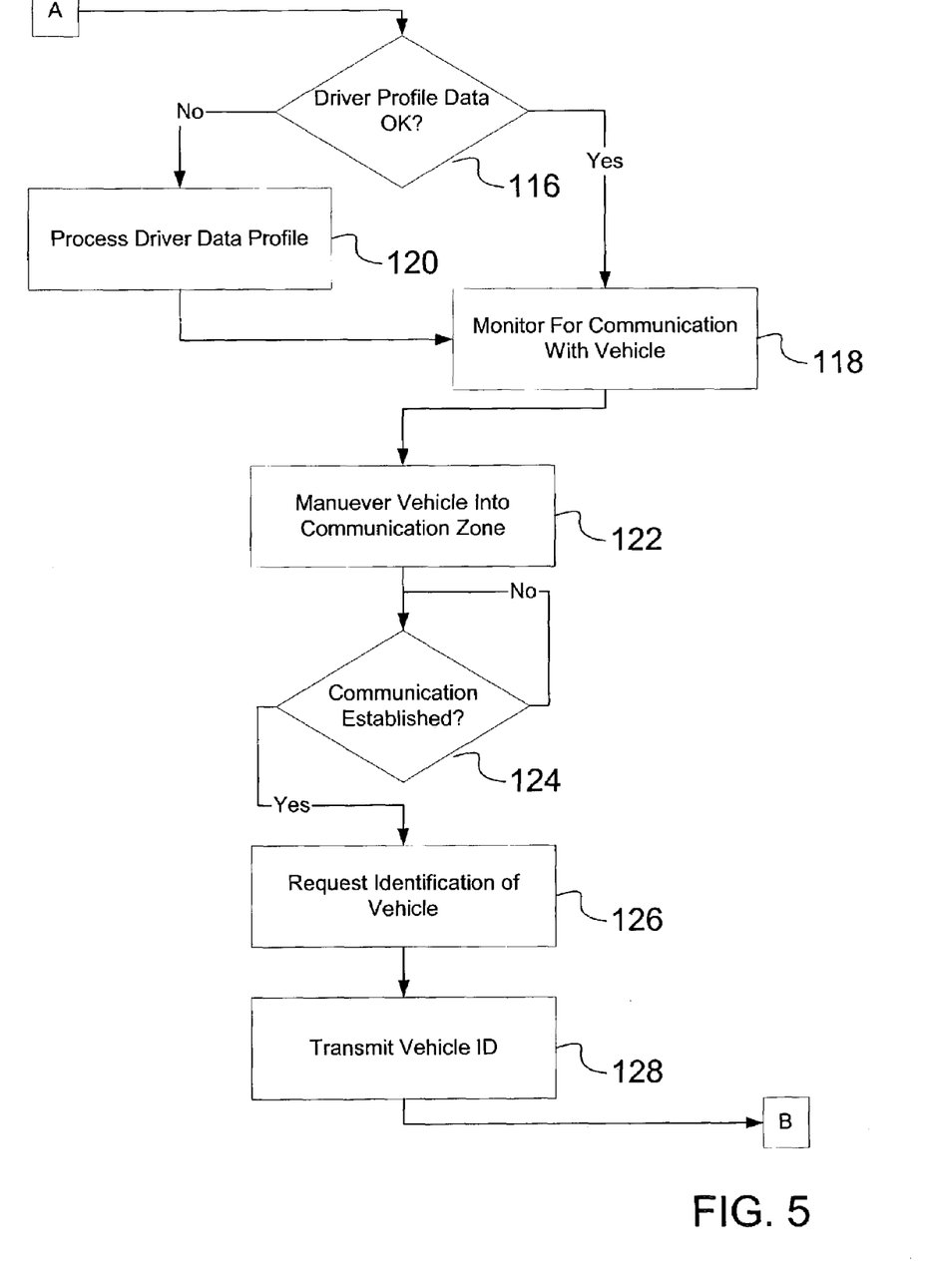

Referring now to FIG. 5, at block 116 the computing system 12 reviews the vehicle specification information 0.64 included in the vehicle profile record 60 for compatibility with the travel itinerary 34 and the vehicle settings 36 of the driver profile record 30. If compatibility exists, the computing system 12 monitors for communication with the rental vehicle at block 118. If compatibility is not confirmed, the computing system 12 further processes the driver specific information included in the driver profile record 30 to make the information compatible with the assigned fleet vehicle at block 120.

The computing system 12 then monitors for establishment of temporary communication with the rental vehicle at block 118. At block 122, the rental vehicle is maneuvered into the communication zone 20 of the short-range radio transceiver 14 (first operational phase). Entry into the communication zone 20 may occur, for example, when the rental vehicle is moved from a rental car storage parking lot to the rental car customer pickup lot within the fleet vehicle staging area.

Upon entry into the communication zone 20, the short-range radio transceiver 14 attempts to establish temporary communication with the vehicle at block 124. If the communication attempt fails, the operation returns to block 124. If temporary communication is established, the computing system 12 requests identification of the vehicle at block 126. At block 128, the vehicle ID 62 is transmitted to the computing system 12 via the short-range radio transceiver 14.

Figure 6:
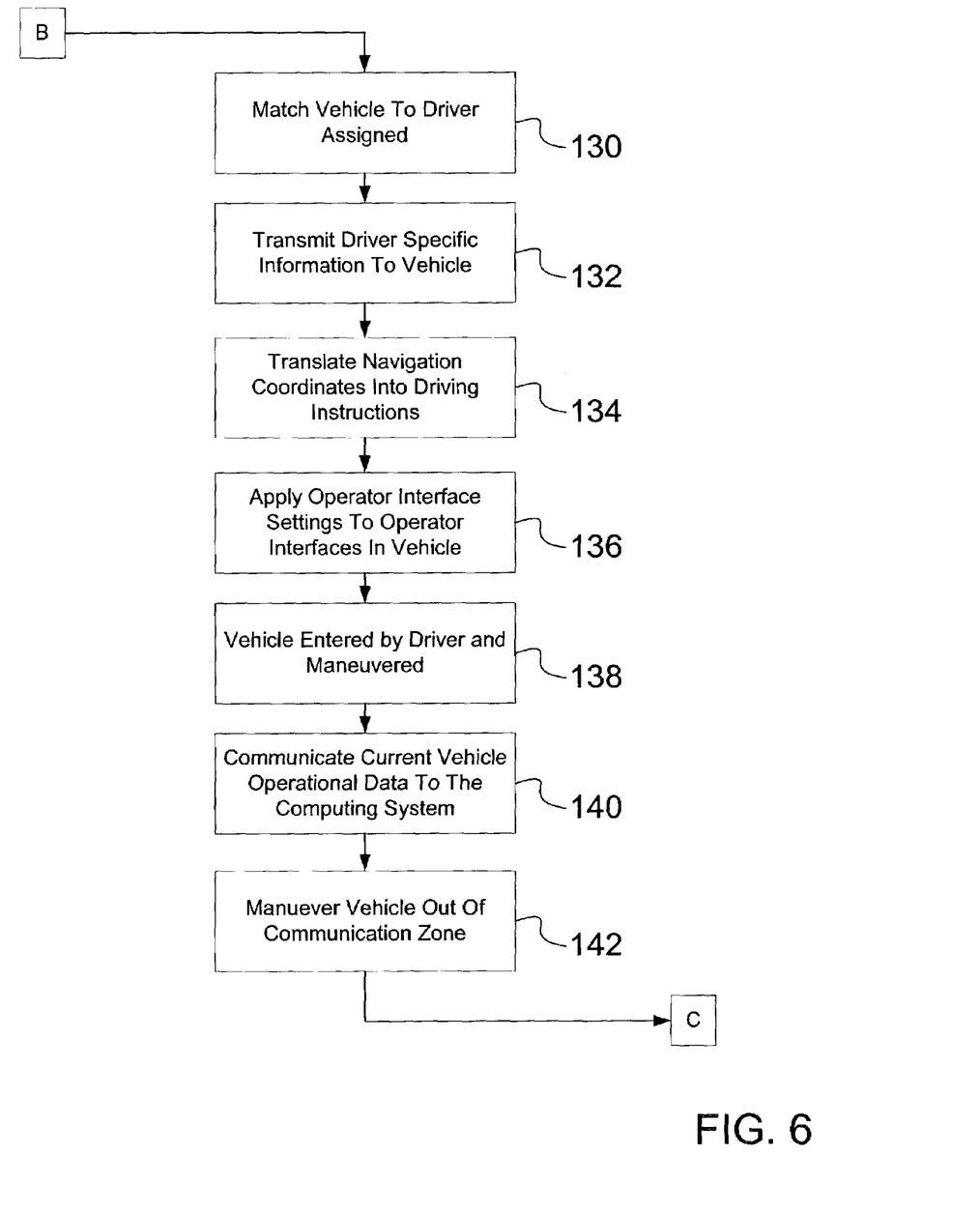

Referring now to FIG. 6, the vehicle ID is dynamically matched to the driver assigned to the vehicle at block 130. At block 132, the driver specific information from the driver profile record 30 is automatically transmitted from the computing system 12 to the fleet vehicle 16 via the short-range radio transceiver 14. The navigation coordinates 48 within the driver specific information are automatically translated into driving instructions for the driver at block 134. The driving instructions may be translated into turn-by-turn driving instructions and/or interactive map directions, such as directions to leave the fleet vehicle staging area and/or directions to the driver's first identified destination. The driving instructions may be automatically displayed to instruct the driver without interaction by the driver.

At block 136, the vehicle setting(s) for the vehicle operator interface(s) such as the radio, seats, mirrors, etc. are transferred in the driver specific information, and automatically applied to the vehicle operator interface(s) within the fleet vehicle 16. The fleet vehicle 16 is entered by the driver and maneuvered to indicate the fleet vehicle 16 is leaving the fleet vehicle staging area (second operational phase) at block 138. The bi-directional communication of driver specific information that includes the vehicle operation data and time of occupancy occurs as the fleet vehicle 16 is maneuvered through the communication zone 20 by the driver at block 140. At block 142, the fleet vehicle 16 maneuvers out of the communication zone 20 and leaves the fleet vehicle staging area (third operational phase).

Figure 7:
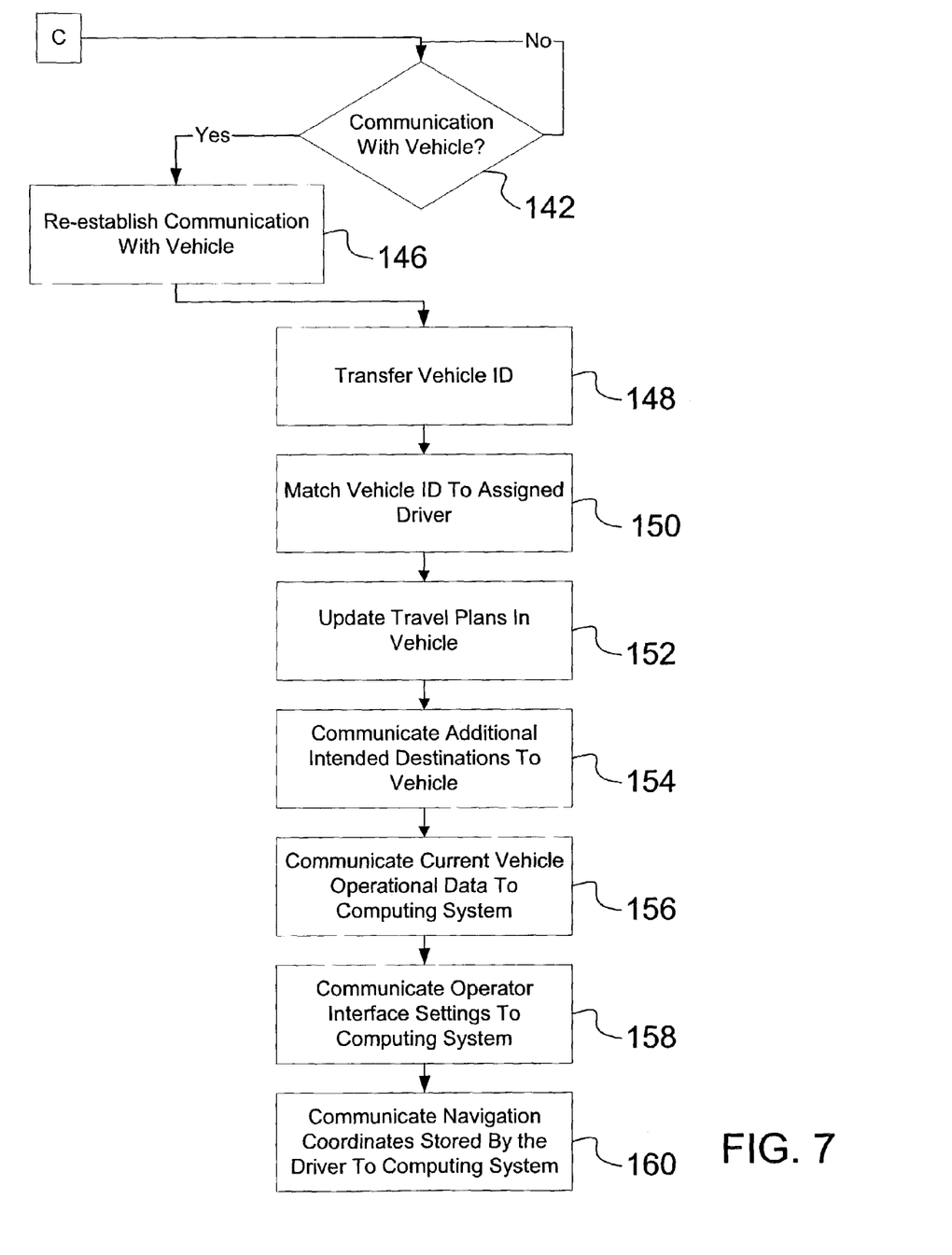

Referring now to FIG. 7, the computing system 12 monitors for re-establishment of communication when the vehicle again enters the communication zone 20 at block 144. If the rental vehicle does not re-enter the communication zone 20, the computing system 12 continues monitoring. If the rental vehicle re-enters the communication zone 20 by returning to the fleet vehicle staging area (fourth operational phase), temporary communication is re-established at block 146. At block 148, the vehicle ID is transferred to the computing system 12 via the short-range radio transceiver 14.

The computing system 12 again matches the vehicle ID to the assigned driver at block 150. Updated passenger travel plans 46 of the driver, such as airline flight status may be transferred to the rental vehicle at block 152. In addition, intended destinations 44 in the form of navigation coordinates such as instructions on where to park the vehicle in the rental car return lot may be transmitted to the rental vehicle at block 154. At block 156, the current vehicle operational data is communicated from the rental vehicle to the computing system 12 and stored in the vehicle profile record 60. In addition, the operator interface settings within the rental vehicle are communicated to the computing system 12 and stored in the vehicle settings 36 of the driver profile record 30 at block 158. Further, at block 160 navigation coordinates stored by the driver during travel are communicated from the rental vehicle to the computing system 12 and stored in the intended destinations 44 of the driver profile record 30.

Based on the bi-directional exchange of information, the rental vehicle company may generate billing information and a printed receipt for the driver. In addition, the rental vehicle company may utilize the information to inform vehicle mechanics of needed maintenance of the vehicle. Similarly, in other vehicle fleet scenarios, the exchanged data may be utilized to operate and maintain the fleet.

Figure 8:
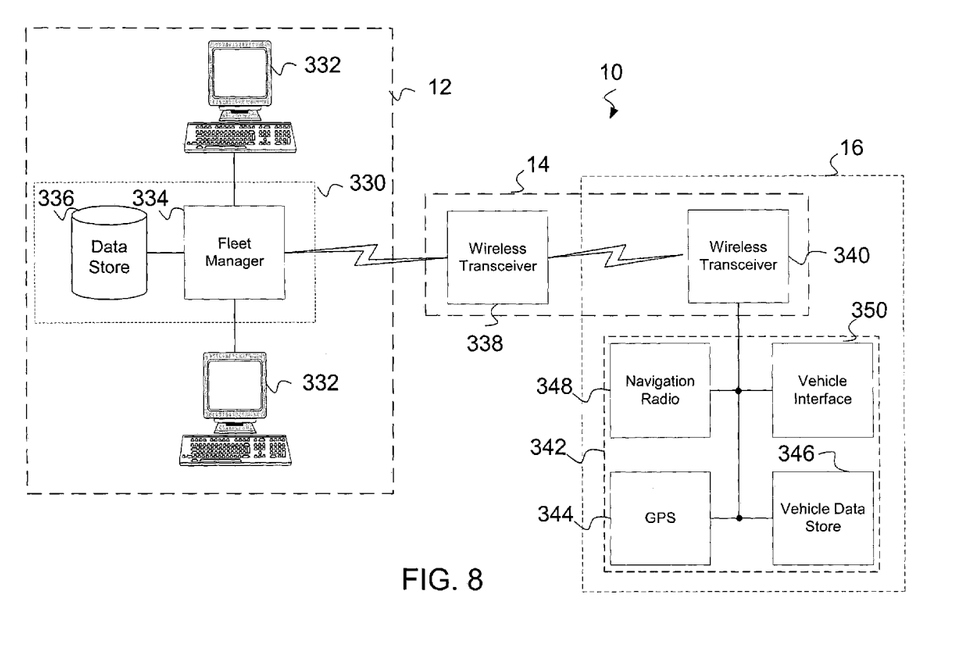
FIG. 8 is a more detailed block diagram of the fleet vehicle navigation system of FIG. 1.

FIG. 8 is a more detailed block diagram of an exemplary fleet vehicle navigation system 10. The fleet vehicle navigation system 10 includes the previously discussed computing system 12, the short-range radio transceiver 14 and the fleet vehicle 16. Similar to the previously discussed system, the fleet vehicle navigation system 10 may be used with a vehicle fleet of rental cars or any other type of fleet vehicle application.

The computing system 12 provides means for storing driver specific information and includes a computer subsystem 330 and at least one user interface 332. The computer subsystem 330 may be generally operable to manage the car fleet and includes a fleet management application 334 and associated data store 336. The components of the computer subsystem 330 may reside on a centrally located computing device (e.g., mainframe), and/or be distributed on computing devices located at various fleet vehicle staging areas and any other operations associated with the maintenance and operation of the fleet vehicles 16.

The fleet management application 334 provides for the receipt, processing, manipulation and storage of fleet vehicle driver assignments and other information relating to the vehicle fleet 16. For example, in a rental vehicle fleet, the fleet management application may receive and store reservation information for rental vehicles in a well-known manner. Additional fleet applications may include schedule management information, vehicle tracking and availability, vehicle diagnostics and reporting and/or any other desirable features of the particular application.

The data store 336 is accessible to the fleet management application 334 and may be used to store the vehicle assignment information and other information relating to the fleet vehicles. In the rental car fleet scenario, vehicle assignment information may include vehicle rental transaction information such as driver, credit card, billing address, etc. The fleet management application 334 may also capture, process and manipulate the driver profile records 30 (FIG. 2) and vehicle profile records 60 as previously discussed. The driver profile records 30 and vehicle profile records 60 may be stored in the data store 336.

The short-range radio transceiver 14 includes a first short-range radio transceiver 338 associated with the computing system 12 and a second short range radio transceiver 340 within each of the fleet vehicles 16. As previously discussed, driver specific information may be communicated using, for example, the Bluetooth standard, when the second short-range radio transceiver 340 is within the communication zone of the first short-range radio transceiver 338. Accordingly, each fleet vehicle 16 may temporarily communicate with the computing system 12 as the fleet vehicle 16 passes through the communication zone 20 as previously discussed with reference to FIG. 1.

Also included in the fleet vehicle 16 is a navigation unit 342. The navigation unit 342 may include a global positioning system (GPS) 344, a vehicle data store 346, a navigation radio 348 and a vehicle interface 350. Alternatively, the navigation unit 342 may also include the second short-range radio transceiver 340. The navigation unit 342 includes means for providing navigational directions to the driver. In addition, the navigation unit 342 may also include/provide other well-known functions such as the audio entertainment system for the fleet vehicle 16. Further, the navigation unit 342 may dynamically provide operational and navigational information for the driver of the fleet vehicle 16.

The GPS 342 within the navigation unit 344 may be any form or satellite positioning system that operates to determine a geographical position of the fleet vehicle 16. The geographical position may be determined in terms of navigational coordinates. The GPS 342 may dynamically provide the geographical position of the fleet vehicle 16 to the navigation radio 348.

The vehicle data storage device 346 may be any data storage device allowing storage, access and manipulation of data. Data within the vehicle data storage device 346 may be stored in a relational database, tables or any other configuration. Driver specific information received by the second short-range radio transceiver 340 may be stored in the vehicle data store 346. In addition, vehicle specific data may be stored in the vehicle data store 346. The vehicle data store 346 may also cooperatively operate and provide data storage for the GPS 344, the navigation unit 348 and the vehicle interface 350.

The navigation radio 348 may be any device capable of providing the driver navigation information based on information provided by the GPS 344. The driver navigation information may be provided to the driver as turn-by-turn driving instructions, an interactive map or any other mechanism for providing navigation directions to a driver of the fleet vehicle 16. The navigation radio 348 may be integrated with the vehicle audio/radio system. Although the present invention is not limited thereto, an exemplary navigation radio is the Traffic Pro™ navigation radio from Becker Automotive Systems. It is to be understood that other types of navigational devices performing similar functionality are also within the scope of present invention.

Driver specific information transmitted to the fleet vehicle 16 may be processed by the navigation radio 348 to generate and display the driver navigation information. Generation and display of the driver navigation information may be based on the navigation coordinates and text strings included in the driver specific information. The navigation radio 348 may process the navigation coordinates to generate and display navigation information in the form of turn-by-turn driving instructions and/or an interactive map.

It is envisioned that an anticipated destination may be designated as a first destination. In this case, the driver is automatically provided with navigation information to the first destination that is identified by the associated text string. The driver may therefore utilize the navigation information without the necessity of being able to manipulate the navigation radio to enable such information. In addition, when the first destination is reached, the anticipated destination designated as a second destination may be automatically provided to the driver. The various anticipated destinations may also be manually selected and enabled by the driver.

The navigation radio 348 may also be directed by the driver to store in the vehicle data store 342 navigation coordinates of the present location of the fleet vehicle 16. As previously discussed, the navigation coordinates stored by the driver while utilizing the fleet vehicle 16 may be communicated to the central computing system 12 when the fleet vehicle 16 again enters the communication zone and temporary communication is established. The navigation radio 348 may also include a disabling capability. Disablement of the navigational features of the navigation radio 348 may be performed with driver specific information. As such, to the extent that navigation features are a paid for service, such as in a rental car scenario, use of the navigational features of the navigation radio 348 by the driver may be prevented.

The driver interface within the navigation radio 348 may allow the driver to manually access and select intended destinations processed by the navigation radio 348. For example, the navigation radio 348 may include a single button that may be depressed to access a list of intended destinations and a rotary knob to select an entry from the list. Alternatively, intended destinations may be automatically selected based on the geographical location of the fleet vehicle 16 such that when a first intended destination is reached, navigation information for a second intended destination is automatically selected. In this way, drivers unfamiliar with the navigation radio 348 may still be provided the full benefits of the system without complex and/or time-consuming interaction with the navigation radio 348.

The vehicle interface 350 may provide bi-directional communication with other existing systems and devices within the fleet vehicle 16 such as, for example, the radio, the seats, the mirrors, the climate control, the engine, the fuel tank and any other systems and devices within the fleet vehicle 16. Communication with the systems and devices may be via a vehicle bus within the fleet vehicle 16 and/or individual communication paths with individual devices. The vehicle interface 350 is similarly capable of communication with the vehicle data store 344 to retrieve vehicle interface settings provided with the driver specific data and store vehicle operational data. The previously discussed vehicle interface settings may be applied to the different vehicle operator interfaces within the vehicle by the vehicle interface 350. Similarly, the previously discussed vehicle operational data may be dynamically collected by the vehicle interface 350 and stored in the vehicle data store 344 for communication to the computing system 12.

A communication port to a wireless communication device such as a wireless cellular telephone may also be included within the vehicle interface 350. The communication port may be a wired connection such as a wireless communication device mounting base or a plug-in communication cable. Alternatively, where the wireless communication device is so equipped, the communication port may communicate via the second short-range radio transceiver 340 using a communication standard such as Bluetooth. Accordingly, the vehicle interface 350 may provide, for example, operation of a handsfree cellular phone. Operation of wireless communication devices either installed in the fleet vehicle 16 or carried into the fleet vehicle 16 by the driver may be fully integrated via the interface device 350 into the vehicle audio system with minimal driver interaction. Using the interface device 350 and a wireless communication device such as a cellular phone, the computing system 12 may communicate with the fleet vehicle 16 outside of the communication zone.

Alternatively, the fleet vehicle navigation system 10 may include only uni-directionally short-range radio communication between the computing system 12 and the fleet vehicle 16. Accordingly, driver specific information may be transmitted only from the computing system 12 to the fleet vehicle 16. In this configuration, the driver specific information may be transmitted by radio waves using a uni-directional wireless communication protocol operating in a radio frequency spectrum such as, less than 300 MHz. For example, the driver specific information may be transmitted over an FM channel which is received by the standard FM tuner residing in the radio of the fleet vehicle 16. Each fleet vehicle radio may be operable to monitor and decode only those transmissions that are designated by vehicle ID for that particular fleet vehicle 16. Once the driver specific information is downloaded to the fleet vehicle 16, the vehicle radio may continue to monitor further broadcast transmissions for subsequent changes to the driver specific information.

To facilitate transmission, multiple short-range radio transceivers may be spread across the fleet vehicle staging area. One skilled in the art will readily recognize that the different wireless transceiver devices will likely utilize different transmission frequencies to avoid interference. Thus, the vehicle radio must be further operable to scan different frequencies to locate an acceptable transmission. To further increase the probability of getting the driver specific information to each of the rental vehicles, each wireless transceiver device may broadcast repetitive copies of destination data.

To further minimize cost, it is envisioned that the driver specific information may be transmitted using RBDS (sub-audible data at a low data rate). There are a number of possible radio configurations which may be implemented cost effectively. First, the vehicle radio may employ a second tuner. In this instance, the secondary tuner may scan and lock to the determined frequencies for a determined period after the tuner is activated. This approach may provide the RF signal needed to communicate the driver specific information with minimal effect on the normal operation of the radio.

In the case of a single tuner, the vehicle radio may download the driver specific data when the vehicle radio is otherwise not in use. For instance, the vehicle radio may be operable to scan and lock to different frequencies when the vehicle is turned on but prior to the driver turning on the radio. This approach may prevent use of the vehicle radio until the driver specific information is successfully downloaded to the fleet vehicle 16.

While various embodiments of the invention have been described, it will be apparent to those of ordinary skill in the art that many more embodiments and implementations are possible that are within the scope of this invention. Accordingly, the invention is not to be restricted except in light of the attached claims and their equivalents.

What is claimed is:

1. A method for communicating driver specific information of a driver of a rental vehicle, the method comprising:

moving a rental vehicle within a communication zone of a short-range radio transceiver;

triggering establishment of temporary communication between the short-range radio transceiver and a navigational unit included in the rental vehicle in response to entry into the communication zone;

transferring driver specific information of a driver assigned to the rental vehicle to the navigation unit via the short-range radio transceiver in response to establishment of temporary communication, where the driver specific information includes driver data, an intended destination of the driver and a vehicle setting to set a vehicle operator interface of the rental vehicle for the driver; and transferring additional driver specific information from the rental vehicle with the short-range radio transceiver in response to control and operation of the rental vehicle by the driver, where the additional driver specific information includes vehicle operational data and the time the rental vehicle was taken by the driver;

maneuvering the rental vehicle out of the communication zone;

re-entering the communication zone at a later time;

triggering transmittal of a navigation coordinate indicative of a drop off point for the rental vehicle and a return time of the rental vehicle in response to re-entry; and automatically generating navigation instructions from the navigation coordinate indicative of a drop off point to guide the driver to the drop off point.

2. The method of claim 1, where maneuvering the rental vehicle out of the communication zone comprises:

storing in the navigation unit additional driver specific information that includes at least one of a navigational coordinate and a vehicle interface setting while out of the communication zone; and triggering further comprises: triggering transfer of the additional driver specific information from the navigational unit with the short-range radio transceiver in response to re-entry into the communication zone.

3. The method of claim 1, where transferring driver specific information comprises automatically applying a vehicle interface setting to the vehicle operator interface of the rental vehicle, where the vehicle operator interface includes at least one of audio settings, seat position settings, mirror position settings, cabin temperature settings, radio tuner sound quality settings and radio tuner radio station setting.

4. The method of claim 3, where automatically applying a vehicle interface setting comprises selecting a radio tuner radio station setting to apply to a radio timer included in the rental vehicle as a function of the intended destination.

5. The method of claim 1, where transferring driver specific information comprises converting the intended destination to driving instructions for the driver.

6. The method of claim 1, where the intended destination comprises a plurality of navigation coordinates indicative of a plurality of destinations and transferring driver specific information includes determining one of the destinations has been designated as a first destination and automatically displaying navigation information to the first destination on a navigation radio.

7. The method of claim 1, where trigger transmittal of a navigation coordinate comprises transmitting to the navigation unit an updated status of a scheduled passenger travel plan reservation of the driver and displaying the updated status.

8. The method of claim 1, where the communication zone is the immediate area around an entrance gate and an exit gate of a rental car facility.

9. A system for communicating driver specific information of a driver of a fleet vehicle, the system comprising.

means for storing driver specific information that includes a navigation coordinate of an intended destination of the driver and an assignment of the driver to a fleet vehicle;

a short-range radio transceiver coupled with the means for storing driver specific information;

a fleet vehicle that includes means for providing navigational directions to the driver, the means for storing driver specific information operable to communicate with the means for providing navigational directions via the short-range radio transceiver in response to entry of the fleet vehicle into a communication zone of the short-range radio transceiver, where the means for storing driver specific information is operable to transmit the navigation coordinate of the intended destination to the means for providing navigational directions upon confirmation of identity of the fleet vehicle during a first entry into the communication zone; and where the means for storing driver specific information is further operable to transmit a navigation coordinate indicative of a drop off point for the fleet vehicle in response to re-entry of the fleet vehicle into the communication zone, and where the means for providing navigational directions to the driver is operable to automatically generating navigation instructions from the navigation coordinate indicative of a drop off point to guide the driver to the drop off point.

10. The system of claim 9, wherein the means for storing driver specific information comprises a fleet management application, a data store and a user interface.

11. The system of claim 9, wherein the means for providing navigational directions comprises a global positioning system, a vehicle data store, a navigation radio and a vehicle interface.

* * * * *

UNITED STATES PATENT AND TRADEMARK OFFICE
CERTIFICATE OF CORRECTION

PATENT NO. : 6,988,034 B1
DATED : January 17, 2006
INVENTOR(S) : Marc R. Marlatt, Jeffrey S. Childress and Marc A. Dissosway It is certified that error appears in the above-identified patent and that said Letters Patent is hereby corrected as shown below:

Column 15,
Line 38, change "setting" to -- settings --.
Line 41, change "timer" to -- tuner --.

Signed and Sealed this

Fourteenth Day of March, 2006

JON W. DUDAS
*Director of the United States Patent and Trademark Office*